United States Patent [19]

Matsumoto et al.

[11] 4,180,318
[45] Dec. 25, 1979

[54] MULTI-COPYING METHOD AND MULTI-COPYING APPARATUS

[75] Inventors: Fuyuhiko Matsumoto, Tokyo; Toshiyuki Inokuchi, Yokohama, both of Japan

[73] Assignee: Ricoh Company, Ltd.

[21] Appl. No.: 909,809

[22] Filed: May 26, 1978

[30] Foreign Application Priority Data

May 31, 1977 [JP] Japan .................................. 52/62755

[51] Int. Cl.$^2$ ............................................ G03G 15/00
[52] U.S. Cl. ........................................ 355/11; 355/66
[58] Field of Search ..................... 355/3 R, 11, 14, 77, 355/20, 66; 96/1 R

[56] References Cited

U.S. PATENT DOCUMENTS

| | | |
|---|---|---|
| 3,526,191 | 9/1970 | Silverberg et al. ............... 355/3 R X |
| 3,615,128 | 10/1971 | Bhagat ................... 355/3 R |
| 3,681,527 | 8/1972 | Nishiyama et al. ............. 355/3 R X |
| 3,859,089 | 1/1975 | Chambers .......................... 96/1 R X |
| 3,879,197 | 4/1975 | Bartlett et al. .................... 96/1 R X |
| 3,918,971 | 11/1975 | Zweig ............................. 355/3 R X |
| 3,964,827 | 6/1976 | Tanaka et al. ..................... 355/35 C |

Primary Examiner—R. L. Moses
Attorney, Agent, or Firm—McGlew and Tuttle

[57] ABSTRACT

In the process and apparatus, the first copy is made from an original document to be copied or from an image information fed to the apparatus in the form of input signals and, from the second copy on, copies are made from the respective preceding copies before the respective preceding copies are discharged from the apparatus until a desired number of identical copies are obtained.

12 Claims, 6 Drawing Figures

MULTI-COPYING METHOD AND MULTI-COPYING APPARATUS

BACKGROUND OF THE INVENTION

The present invention relates to a multi-copying method for use in an electrophotographic copying apparatus and to an electrophotographic multi-copying apparatus.

In a conventional multi-copying method and a conventional multi-copying apparatus, each copy is repeatedly made from an original document or from identical input signals, corresponding to an image to be copied, fed to the multi-copying apparatus by the read-out of an image information of the image.

Therefore, irrespective of the types of original documents, such as sheet originals and book originals, each copy has to be made by scanning the same original repeatedly. Consequently, there is a limitation to the shortening of each copy cycle and, accordingly, a great amount of time is required for the multi-copying process.

SUMMARY OF THE INVENTION

It is therefore a principal object of the present invention to provide a multi-copying method and a multi-copying apparatus which can greatly speed up the multi-copying process.

Another object of the present invention is to provide a multi-copying apparatus capable of making copies from ordinary original documents and also from an input image information fed to the multi-copying apparatus in the form of video signals.

A further object of the present invention is to provide a multi-copying apparatus capable of making copies having a high and identical image quality in as large a number as desired.

In order to attain the above-mentioned objects, in the present invention, the first copy is made from an original document to be copied or from an image information fed to the multi-copying apparatus in the form of input video signals and, from the second copy on, copies are made from the respective preceding copies before the respective preceding copies are discharged from the multi-copying apparatus, until a desired number of identical copies are obtained.

Therefore, according to the present invention, only the first copy is made from the original document or from the input signals, but, from the second copy on, identical multiple copies are made without the use of the original document and the input signals.

As a result, it is unnecessary to transport the original document to be copied for scanning once the first copy is made. This reduces significantly the multi-copying time.

Furthermore, in the case where an image information is fed to the multi-copying apparatus in the form of input video signals, copies having the same and high image quality can be obtained as large a number as desired, from the second copy on, by the electric processing of the input video signals.

DETAILED DESCRIPTION OF THE PREFERRED EMBODIMENTS

Figure 1:
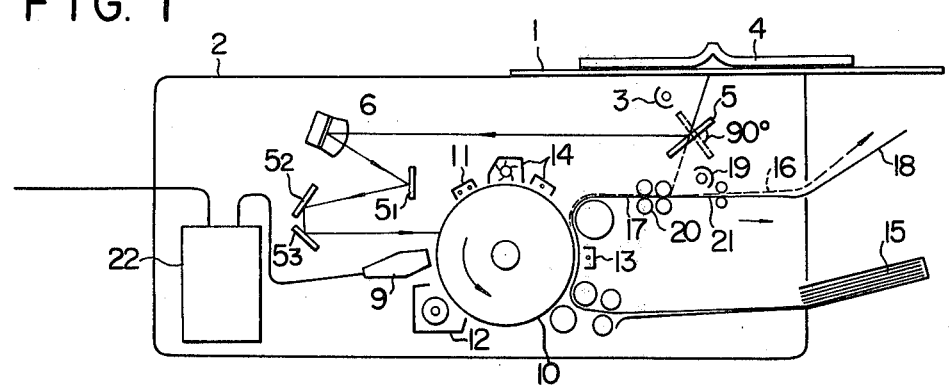
FIG. 1 is a schematic sectional view of an embodiment of a multi-copying apparatus according to the present invention, in which the first copy is being made.

Referring to FIG. 1, there is shown an embodiment of a multi-copying apparatus according to the present invention, in which the multi-copying is made directly from an original document. Reference numeral 1 represents a document platen, which is provided on the top of a casing 2 of the multi-copying apparatus. Inside the casing 2 is disposed a light source 3, which illuminates a copy side of an original document 4 placed face-down on the document platen 1.

An image information from the original document 4 is directed to an in-prism lens 6 by a rotatable mirror 5 which has been rotated into the first position indicated by the solid lines, so that the image information is caused to reach the surface of a photoconductor drum 10 through the in-prism lens 6, mirrors $5_1$, $5_2$, $5_3$. Thus, the image information is recorded on the surface of the photoconductor drum 10.

In the above-mentioned optical system, it is necessary to obtain an image to be transferred on the surface of the photoconductor drum 10 and also to make the movement direction of the image coincide with the rotating direction of the photoconductor drum 10. In the embodiment of the present invention shown in FIG. 1, this is accomplished by the optical system comprising the in-prism lens 6 and four mirrors (an even number of mirrors). Furthermore, formation of a mirror-image, that is, an image with the right and left sides of the original image reversed is obviated by disposing an edge of a prism of the in-prism lens 6 parallel to the generating lines of the peripheral surface of the photoconductor drum 10. Around the photoconductor drum 10 are arranged a corona charger 11, a development apparatus 12, an image transfer charger 13, and a quenching and charging apparatus 14.

A transfer sheet 15, which passes between the image transfer charger 13 and the surface of the photoconductor drum 10, is transported along a copy paper transport passage 17, with a transferred image thereon, and is then discharged onto a copy tray 18. Reference numeral 16 represent a transferred image bearing copy paper. The copy transport passage 17 is disposed under the rotatable mirror 5. By the rotatable mirror 5 being rotated by 90°, the image information from the copy paper 16 is directed to the in-prism lens 6. Along the copy transport passage 17, there are disposed an image fixing station 20 and a copy read-out station 21.

In the above-mentioned embodiment of the invention, the first copy is made from the original document 4 (in this embodiment, the original document 4 is a book), with the original document 4 being scanned so as to record the image information from the original document 4 on the surface of the photoconductor drum 10 through the rotatable mirror 5 and the in-prism lens 6. While the thus obtained copy paper 16 is caused to pass through the copy read-out station 21, the image information copied on the copy paper 16 is directed to the in-prism lens 6 by a light source 19 and by the rotatable mirror 5 which has been rotated from the first position by 90°, that is, by the rotatable mirror 5 being positioned in the second position indicated by the dash lines, so that the image information copied on the copy paper 16 is recorded on the surface of the photoconductor drum 10 as the image information for the next copy.

Thereafter, the copy paper 16, passing through the copy transparent passage 17, is discharged onto the copy tray 18, and while the copy paper 16 passes through the copy read-out station 21, the image information for the next copy is transmitted to the surface of the photoconductor drum 10 by the above-mentioned optical system.

An image information transmitted from outside in the form of an outer input signal is received at an outer input signal control apparatus 22 and is recorded on the surface of the photoconductor drum 10 by a plotter 9. The thus obtained image information is multi-copied in the same manner as mentioned above by the same mechanism. Some differences are caused between the first copy (made by the outer input signal) and the succeeding copies in their respective recording positions on the photoconductor drum 10. However, such differences can be overcome by adjusting the timing of the respective paper feedings.

In the embodiments hereinafter described, the same reference numerals are given to the same or substantially the same elements.

Figure 2:
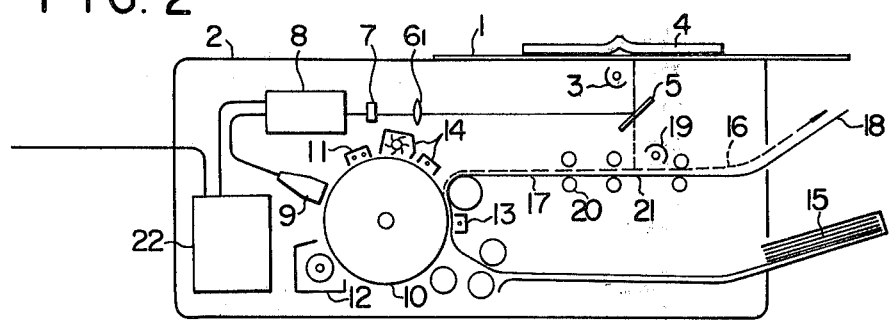
FIG. 2 is a schematic sectional view of another embodiment of a multi-copying apparatus according to the present invention, in which the first copy is being made.
Figure 3:
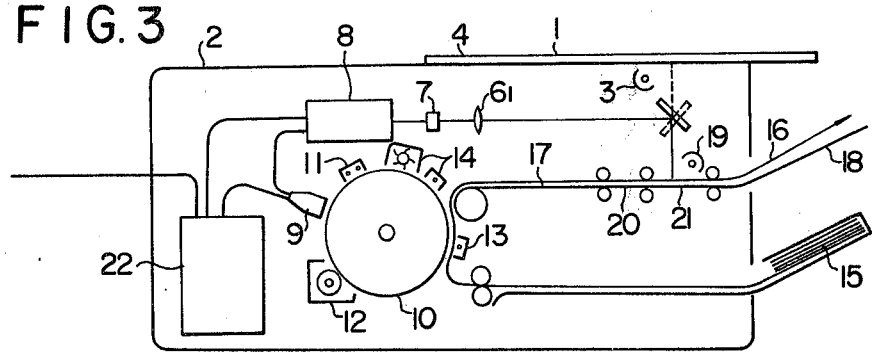
FIG. 3 is a schematic sectional view of the multi-copying apparatus of FIG. 2, in which a copy after the first copy is being made.

Referring to FIGS. 2 and 3, there is shown another embodiment of a multi-copying apparatus operated by digital signals according to the present invention. In the figures, a document platen 1 is provided at an upper portion of a casing 2 of the apparatus. Inside the casing 2 is disposed a light source 3 which illuminates a copy side of an original document 4 to be copied which is placed face-down on the document platen 1.

An image information from the original document 4 is directed to a focusing lens 6₁, by a rotatable mirror 5 which is rotatable by 90° so that image information is read by a charge coupled device 7. A video signal from the charge coupled device 7 is fed to a video output signal processing device 8 where the video signal is processed by waveform shaping and other additional functions of the video output signal processing device 8, and is then recorded on the surface of a photoconductor drum 10 by a plotter 9.

Around the photoconductor drum 10 are arranged a corona charger 11, a development apparatus 12, an image transfer charger 13, and a quenching and cleaning apparatus 14.

A transfer sheet 15 passes between the image transfer charger 13 and the photoconductor drum 10 and is transported along a copy paper transport passage 17 in the form of a transferred image bearing copy paper 16 and is discharged onto a copy tray 18.

The copy paper transport passage 17 is disposed under the rotatable mirror 5. By a 90° rotation of the rotatable mirror 5 and by a light source 19, an image information from the transferred image bearing copy 16 is directed to the charge coupled device 7.

An image fixing station 20 and a copy readout station 21 are disposed along the copy paper transport passage 17.

A signal from an output input signal control apparatus 22 is also fed to the video output signal processing device 8. When this signal is recorded on the surface of the photoconductor drum 10 through the plotter 9, the rotatable mirror 5 is turned, from the beginning, into a position indicated by the dash lines (FIG. 3), namely, in a position for directing the image information from the copy paper 16 to the charge coupled device 7.

In the above-mentioned embodiment, an original document 4 (a book original in this embodiment) is scanned and the image information obtained by the scanning is directed to the lens 6₁ by the rotatable mirror 5 and is read by the charge coupled device (CCD) 7.

When the thus obtained copy paper 16 passes through the copy read-out station 21, the copy paper 16 is scanned by the light source 19 and the image information from the copy paper 16 is directed to the charge coupled device 7 by the rotatable mirror 5 so that the image information is recorded on the surface of the photoconductor 10 in the form of the signals corresponding to the image of the copy. Hereafter, the successive copies 16 are read by the copy read-out station 21 when they are transported along the copy paper transport passage 17 to the copy tray 18 so that their respective image information is successively transmitted to the charge coupled device 7 for their respective next copies (refer to FIG. 3).

Signals from the charge coupled device 7 are processed at the video output signal processing device 8 by waveform shaping and additional functions of the video output signal processing device 8 so that the image quality of each copy is maintained. In this case, S/N correction at the video processing is set so as to overcome the degradation of the S/N caused during the development step and the image transfer step, whereby the image quality of each copy is maintained.

In the above-mentioned embodiment, once the image information is subjected to a photoelectric conversion, all the electric signals are converted to light signals. Thus, so long as the electric signals are processed properly, the image quality of each copy is not degraded regardless of the number of the multi-copies.

In the case where an image information is fed to the outer input signal control apparatus 22 in the form of an outer electric signal corresponding to the image information, the electric signal is corrected from the first copy so that a high image quality is obtained from the first copy.

Figure 4:
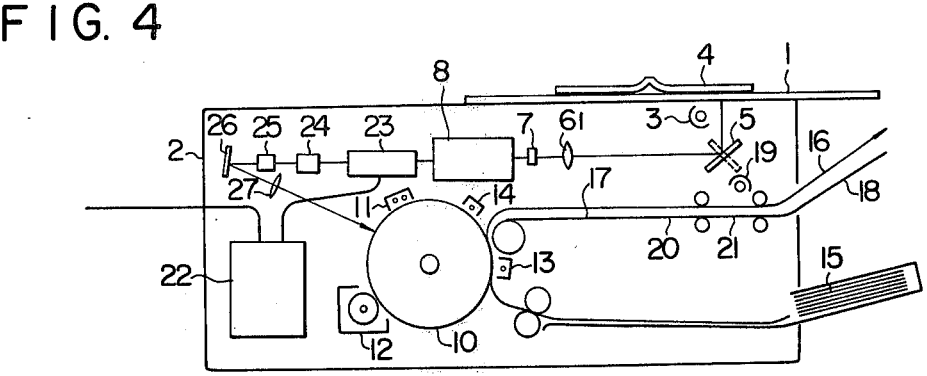
FIG. 4 is a schematic sectional view of a further embodiment of a multi-copying apparatus according to the present invention, in which a laser apparatus is employed as a plotter.

Referring to FIG. 4, there is shown a further embodiment of a multi-copying apparatus of the present invention, in which a laser apparatus 23 is utilized as the plotter. A signal drawn from a video output signal processing device 8 is fed to the laser apparatus 23 and is recorded on the surface of a photoconductor 10 through a modulator 24, a beam expander 25, a galvanomirror 26, and a $f\theta$ lens 27. The other steps for copying are the same as in the previously mentioned embodiments of the present invention.

Figure 5:
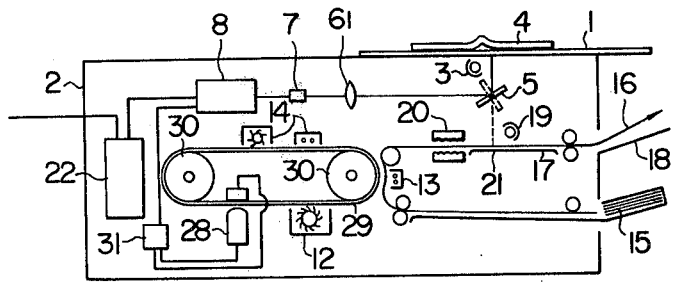
FIG. 5 is a schematic sectional view of a further embodiment of a multi-copying apparatus according to the present invention, in which a dielectric endless belt is employed as a recording material, and a duplex type multi-stylus is employed as the plotter.
Figure 6:
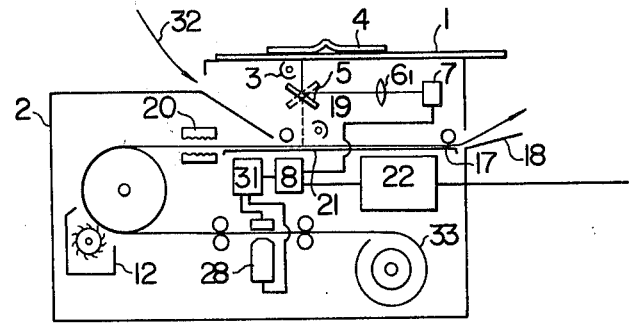
FIG. 6 is a schematic sectional view of a further embodiment of a multi-copying apparatus according to the present invention, in which an electrostatic recording paper is employed as the recording material, and a duplex type multi-stylus is employed as the plotter.

Referring to FIGS. 5 and 6, there is shown a further embodiment of a multi-copying apparatus in which a duplex control type multi-stylus 28 is employed as a plotter. In FIG. 5, a signal drawn from the video output signal processing device 8 is recorded on a dielectric endless belt 29 through a multi-stylus driver 31. The other steps for copying are the same as in the previously mentioned embodiments of the present invention. FIG. 6 shows a further embodiment of a multi-copying apparatus of the invention. In this embodiment, since a signal is recorded directly on an electrostatic recording paper by a multi-stylus electrode, the charge quenching and the cleaning steps for a recording material, such as a photoconductor drum, a dielectric recording drum, and a dielectric recording endless belt, and the image transfer step are eliminated so that the copying process and the apparatus therefor can be advantageously simplified. In this embodiment, the copying of a sheet original 32 as well as a book original 4 is feasible. Furthermore, instead of the multi-stylus electrode a thermal multi-head or a conductive multi-head can be utilized as a plotter so as to construct an apparatus similar to the apparatus of FIG. 6 by use of a method similar to the method of FIG. 6.

While specific embodiments of the invention have been shown and described in detail to illustrate the application of the principles of the invention, it will be understood that the invention may be embodied otherwise without departing from such principles.

What is claimed is:

1. An electrophotographic multi-copying apparatus comprising, in combination, a recording material operable to have an image to be copied recorded thereon, an optical system operable to project said image onto said recording material, a mirror rotatable between first and second positions and, in the first position, transmitting an image of an original document to be copied to said optical system and, in the second position, transmitting an image of each copy made by said electrophotographic multi-copying apparatus to said optical system, before each copy is discharged from said electrophotographic multi-copying apparatus, said mirror continuously maintaining said second position after the first copy is made, until a desired number of identical copies are made from the respective preceding copies.

2. An electrophotographic multi-copying apparatus as claimed in claim 1, wherein said optical system comprises an in-prism lens and a plurality of mirrors.

3. An electrophotographic multi-copying apparatus as claimed in claim 1, wherein said mirror is rotatable through an angle of 90 degrees.

4. An electrophotographic multi-copying apparatus as claimed in claim 1, including an outer input signal control apparatus for receiving an image to be copied in the form of video input signals, and a plotter operable to apply said video input signals to said recording material for recording said image on said recording material.

5. An electrophotographic multi-copying apparatus comprising: a recording material operable to have an image of an original document to be recorded thereon, a photoelectric system operable to convert said image to electric signals and to apply said electric signals to said recording material, a mirror rotatable between first and second positions and, in the first position, transmitting an image of an original document to be copied to said photoelectric system and, in the second position transmitting an image of each copy made by said electrophotographic multi-copying apparatus to said photoelectric system before each copy is discharged from said electrophotographic multi-copying apparatus, said mirror continuously maintaining the second position after the first copy is made, until a desired number of identical copies are made from the respective preceding copies.

6. An electrophotographic multi-copying apparatus as claimed in claim 5, wherein said photoelectric system comprises a focusing lens operable to focus an optical image of an image to be copied, a charge coupled device operable to convert said optical image to video signals, a video output signal processing device operable to shape the waveform of said video signals, and a plotter operable to the shaped video signals to said recording material.

7. An electrophotographic multi-copying apparatus as claimed in claim 5, including an outer input signal control apparatus for receiving an image to be copied in the form of video input signals, and which is connected to said photoelectric system.

8. An electrophotographic multi-copying apparatus as claimed in claim 6, wherein said plotter comprises a laser apparatus.

9. An electrophotographic multi-copying apparatus as claimed in claim 6, wherein said plotter comprises a laser apparatus, a modulator, a beam expander, a galvanomirror, and a $f\theta$ lens.

10. An electrophotographic multi-copying apparatus as claimed in claim 6, wherein said plotter comprises a duplex type multi-stylus and a multi-stylus driver connected to said video output signal processing device.

11. An electrophotographic multi-copying apparatus as claimed in claim 6, wherein said plotter comprises a thermal multi-head.

12. An electrophotographic multi-copying apparatus as claimed in claim 6, wherein said plotter comprises a conductive multi-head.

* * * * *